United States Patent
Zhao et al.

(10) Patent No.: US 10,551,559 B2
(45) Date of Patent: Feb. 4, 2020

(54) OPTICAL ASSEMBLY AND LIQUID CRYSTAL DISPLAY DEVICE WITH THE OPTICAL ASSEMBLY

(71) Applicants: Boe Technology Group Co., Ltd., Beijing (CN); Beijing Boe Display Technology Co., Ltd., Beijing (CN)

(72) Inventors: Hongyu Zhao, Beijing (CN); Inho Park, Beijing (CN); Kai Diao, Beijing (CN); Yutao Hao, Beijing (CN); Junjie Guo, Beijing (CN); Yang Chu, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/327,150

(22) PCT Filed: Jul. 8, 2016

(86) PCT No.: PCT/CN2016/089327
§ 371 (c)(1),
(2) Date: Jan. 18, 2017

(87) PCT Pub. No.: WO2017/067238
PCT Pub. Date: Apr. 27, 2017

(65) Prior Publication Data
US 2017/0307811 A1    Oct. 26, 2017

(30) Foreign Application Priority Data
Oct. 20, 2015   (CN) .......................... 2015 1 0678637

(51) Int. Cl.
G02B 6/02     (2006.01)
G02B 6/36     (2006.01)
F21V 8/00     (2006.01)

(52) U.S. Cl.
CPC ....... G02B 6/0229 (2013.01); G02B 6/02209 (2013.01); G02B 6/3608 (2013.01); G02B 6/0023 (2013.01); G02B 6/02 (2013.01)

(58) Field of Classification Search
CPC ............. G02B 6/0229; G02B 6/02209; G02B 6/3608; G02B 6/02; G02B 6/0023;
(Continued)

(56) References Cited

U.S. PATENT DOCUMENTS

| 5,793,911 A | 8/1998 | Foley |
| 6,236,799 B1 * | 5/2001 | Huh ........................ G02F 1/011 385/130 |

(Continued)

FOREIGN PATENT DOCUMENTS

| CN | 1673827 A | 9/2005 |
| CN | 201096311 | 8/2008 |

(Continued)

OTHER PUBLICATIONS

International Search Report for PCT/CN2016/089327 dated Oct. 8, 2016.

(Continued)

*Primary Examiner* — Michael H Caley
*Assistant Examiner* — Mariam Qureshi
(74) *Attorney, Agent, or Firm* — Calfee, Halter & Griswold LLP

(57) ABSTRACT

The embodiments of the present disclosure provide an optical assembly and a liquid crystal display device using the optical assembly. The optical assembly has a simple structure and low cost, and can realize a high color gamut (Continued)

display. The optical assembly comprises a first substrate layer, a second substrate layer, and an optical fiber layer arranged between the first substrate layer and the second substrate layer. The optical fiber layer is composed of a plurality of optical fibers arranged closely in a single layer. A plurality of adhesive blocks in contact with the plurality of optical fibers are arranged on a surface of at least one of the first substrate layer and the second substrate layer. At the contact regions between the adhesive blocks and the plurality of optical fibers, total internal reflection in the optical fibers is inhibited by the adhesive blocks.

18 Claims, 1 Drawing Sheet

(58) Field of Classification Search
CPC .............. G02F 1/0115; G02F 1/0118; G02F 1/133524; G02F 1/12252; G02F 1/3131
See application file for complete search history.

(56) References Cited

U.S. PATENT DOCUMENTS

| | | | | |
|---|---|---|---|---|
| 10,101,553 | B2* | 10/2018 | Bauco | F21V 9/08 |
| 2009/0322985 | A1 | 12/2009 | Mizuuchi | |
| 2010/0157623 | A1* | 6/2010 | Tanahashi | G02B 6/0043 |
| | | | | 362/606 |
| 2011/0103757 | A1* | 5/2011 | Alkemper | C03B 37/01211 |
| | | | | 385/124 |
| 2012/0188791 | A1* | 7/2012 | Voloschenko | G02B 5/0252 |
| | | | | 362/606 |
| 2012/0200801 | A1* | 8/2012 | Wheatley | G02B 6/005 |
| | | | | 349/61 |
| 2014/0085929 | A1 | 3/2014 | Leng | |
| 2015/0108508 | A1* | 4/2015 | Wu | G02F 1/157 |
| | | | | 257/84 |
| 2017/0045660 | A1* | 2/2017 | Tang | G02B 6/0006 |

FOREIGN PATENT DOCUMENTS

| | | | |
|---|---|---|---|
| CN | 201096311 Y | * | 8/2008 |
| CN | 101440919 | | 5/2009 |
| CN | 101718887 | | 6/2010 |
| CN | 102913866 | | 2/2013 |
| CN | 102913866 A | | 2/2013 |
| CN | 103364864 A | | 10/2013 |
| CN | 103807672 | | 5/2014 |
| CN | 104676387 A | | 5/2015 |
| CN | 104676387 | | 6/2015 |
| CN | 105158977 | | 12/2015 |
| CN | 205015593 | | 2/2016 |
| JP | 2008287933 | | 11/2008 |
| KR | 20120108479 | | 10/2012 |
| WO | 2012148670 A1 | | 11/2012 |

OTHER PUBLICATIONS

First Office Action from China Application No. 201510678637.0 dated Nov. 3, 2017.
Search Report from European Patent Application No. 16823148.8 dated May 13, 2019.

* cited by examiner

OPTICAL ASSEMBLY AND LIQUID CRYSTAL DISPLAY DEVICE WITH THE OPTICAL ASSEMBLY

RELATED APPLICATIONS

The present application is the U.S. national phase entry of the international application PCT/CN2016/089327, with an international filing date of Jul. 8, 2016, which claims the benefit of Chinese Patent Application No. 201510678637.0, filed on Oct. 20, 2015, the entire disclosures of which are incorporated herein by reference.

TECHNICAL FIELD

The present disclosure relates to the field of liquid crystal display technology, in particular to an optical assembly capable of realizing high color gamut display and a liquid crystal display device with the optical assembly.

BACKGROUND

Liquid crystal display device is entering more and more people's lives due to its thin and stylish appearance and healthy characteristics without radiation. However, at present, the traditional liquid crystal display device also has many shortcomings. The demand for liquid crystal display technology is typically on the performance of color. With the popularity of 4K TV, the Rec.2020 standard is of concern. In August 2012, ITU integrated the technical specification of Japanese Super Hi-Vision 8K ultra high definition television broadcasting system and the world mainstream 4K ultra high definition television broadcasting system, and generalized the international standard for the Rec.2020 ultra high definition television broadcasting system and program source production. The Rec.2020 standard is also known as the BT.2020 standard. In the Rec.2020 standard, the color gamut is further required. Other wide color gamut standards have emerged. For the new color gamut standards, high color gamut display devices will become a trend.

Nowadays the demand for high color gamut display is becoming higher and higher. In order to improve the color gamut of display, the quantum dot technology is typically applied. The so-called quantum dot is a kind of nanometer material, of which the grain diameter is 2-10 nm. Based on their diameters, the quantum dots under stimulation of electricity or light can emit monochromatic light of different colors. The quantum dot technology can thus improve the color gamut value of display by means of the RGB monochromatic light with concentrated energy spectrum emitted by the quantum dots.

However, the quantum dot technology has a relatively high cost and a complicated structure.

SUMMARY

To realize display with a wide color gamut (or, high color gamut), high color gamut display devices are strongly demanded. To this end, the present disclosure aims to provide an optical assembly and a liquid crystal display device using the optical assembly. The optical assembly has a simple structure and low cost, and can realize a high color gamut display.

An embodiment of the present disclosure provides an optical assembly. The optical assembly comprises a first substrate layer, a second substrate layer, and an optical fiber layer arranged between the first substrate layer and the second substrate layer. The optical fiber layer is composed of a plurality of optical fibers arranged closely in a single layer. A plurality of adhesive blocks in contact with the plurality of optical fibers are arranged on a surface of at least one of the first substrate layer and the second substrate layer. At the contact regions between the adhesive blocks and the plurality of optical fibers, total internal reflection in the optical fibers is inhibited by the adhesive blocks.

In the embodiment of the disclosure, total internal reflection in the optical fibers is inhibited by the adhesive blocks, realizing a uniform light output. A display apparatus with a high color gamut can thus be provided.

In certain exemplary embodiments, a refractive index of the adhesive block at the contact region is higher than a refractive index of the optical fiber.

Alternatively, a refractive index of the adhesive block at the contact region is equal to a refractive index of the optical fiber, the adhesive block at the contact region is in close contact with the optical fiber.

Alternatively, a refractive index of the adhesive block at the contact region is lower than a refractive index of the optical fiber and higher than a refractive index of air.

In certain exemplary embodiments, a distribution density of the plurality of adhesive blocks on the surface of at least one of the first substrate layer and the second substrate layer increases with the increase of a distance from an incident end of the optical fiber.

In certain exemplary embodiments, a material of the adhesive block is UV curable adhesive.

In certain exemplary embodiments, the first substrate layer is a reflective layer, the second substrate layer is an optical film layer. Alternatively, the first substrate layer is an optical film layer, the second substrate layer is a reflective layer.

An embodiment of the present disclosure provides a liquid crystal display device. The liquid crystal display device comprises a liquid crystal display panel with a color film layer, the abovementioned optical assembly arranged beneath the liquid crystal display panel, and an RGB tri-color laser light source for providing RGB tri-color laser. The liquid crystal display device further comprises an optical coupler and a light splitter. The optical coupler is used for coupling the RGB tri-color laser provided by the RGB tri-color laser light source into a white light beam. The light splitter is used for dividing the white light beam into a plurality of light beams and guiding each of the plurality of light beams into each of the plurality of optical fibers respectively. The optical fibers are arranged corresponding to sub-pixels in the liquid crystal display panel.

In the embodiment of the disclosure, total internal reflection in the optical fibers is inhibited by the adhesive blocks, realizing a uniform light output. A display device with a high color gamut can thus be provided.

In certain exemplary embodiments, each of the optical fibers is arranged corresponding to each of the sub-pixels in the liquid crystal display panel.

In certain exemplary embodiments, each of the optical fibers is arranged corresponding to a plurality of sub-pixels in the liquid crystal display panel, each sub-pixel corresponds to an adhesive block.

In certain exemplary embodiments, the light splitter divides the white light beam into a plurality of light beams with the same energy and guiding each of the plurality of light beams into each of the plurality of optical fibers respectively.

In certain exemplary embodiments, the optical fibers are arranged such that light transmitted in each optical fiber can only enter a corresponding sub-pixel in the liquid crystal display panel.

In certain exemplary embodiments, a length of the optical fiber is larger than a corresponding length of a display area of the liquid crystal display panel, a diameter of the optical fiber is smaller than a corresponding length of a sub pixel in the display area.

In certain exemplary embodiments, the liquid crystal display panel comprises a color film layer. Each laser beam emitted from the RGB tri-color laser light source is equally divided into several parts, which several parts are respectively provided to the optical fibers in a predetermined circular sequence. The optical fibers are arranged in the predetermined circular sequence which is same to an arrangement sequence for RGB filters in the color film layer.

In certain exemplary embodiments, each laser beam emitted from the RGB tri-color laser light source is equally divided into several parts, which several parts are respectively provided to the optical fibers in a predetermined circular sequence. The optical fibers are arranged in the predetermined circular sequence which is same to an arrangement sequence for RGB filters in the color film layer. An alignment accuracy error for the optical fibers one-to-one corresponding to the sub-pixels in the liquid crystal display panel is less than 1 micrometer.

An embodiment of the present disclosure further provides a liquid crystal display device. The liquid crystal display device comprises a liquid crystal display panel, the above-mentioned optical assembly arranged beneath the liquid crystal display panel, and an RGB tri-color laser light source for providing RGB tri-color laser to the optical fibers in the optical assembly. Each of the optical fibers is arranged corresponding to each sub-pixel in the liquid crystal display panel.

In certain exemplary embodiments, the optical fibers are arranged such that light transmitted in each optical fiber can only enter a corresponding sub-pixel in the liquid crystal display panel.

In certain exemplary embodiments, a length of the optical fiber is larger than a corresponding length of a display area of the liquid crystal display panel, a diameter of the optical fiber is smaller than a corresponding length of a sub pixel in the display area.

In the embodiment of the disclosure, total internal reflection in the optical fibers is inhibited by the adhesive blocks, realizing a uniform light output. A display device with a high color gamut can thus be provided. Moreover, the optical fibers transmitting light with different colors are arranged in a predetermined circular sequence, the predetermined circular sequence is same to an arrangement sequence for the filters in the color film layer. In such a manner, the transmittance of the color film layer is relatively high. Crosstalk light from adjacent optical fiber can be absorbed. The overall transmittance can thus be improved, thereby reducing energy consumption. Moreover, if the alignment accuracy error for the optical fibers and the sub-pixels in the liquid crystal display panel is optimized and reduced to less than 1 micrometer, crosstalk between the optical fibers can be further reduced. Therefore the color film layer is no more required, while the transmittance can be further improved.

DETAILED DESCRIPTION

Some embodiments of the present disclosure are introduced in the following to provide a basic understanding of the present disclosure. It is not intended to identify the key or decisive elements of the present disclosure or to limit the protection scope of the invention.

Figure 1:
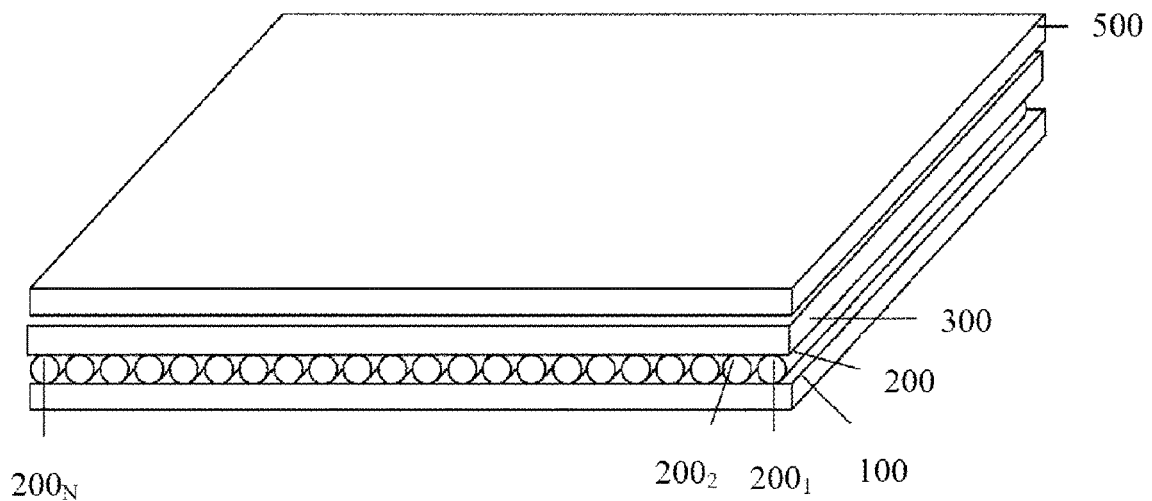
FIG. 1 is a structural schematic diagram of an optical assembly according to an embodiment of the disclosure.

FIG. 1 is a structural schematic diagram of an optical assembly according to an embodiment of the invention.

As can be seen from FIG. 1, an embodiment of the present disclosure provides an optical assembly. The optical assembly comprises a first substrate layer 100, a second substrate layer 300, and an optical fiber layer 200 arranged between the first substrate layer 100 and the second substrate layer 300.

The optical fiber layer 200 is composed of a plurality of optical fibers $200_1$, $200_2$, ... $200_n$ arranged closely in a single layer. In the context of the present disclosure, the plurality of optical fibers $200_1$, $200_2$, ... $200_n$ are fibers capable of guiding light. However, the plurality of optical fibers are not conventional optical fibers. The optical fiber in the embodiments of the disclosure is similar to a conventional glass fiber, and the material for the optical fiber can be glass or other materials capable of transmitting light.

In certain exemplary embodiments, the optical fibers $200_1$, $200_2$, ... $200_n$ can be made of a glass material with a high transmittance and a high refractive index. The cross section of each of the optical fibers $200_1$, $200_2$, ... $200_n$ can be round or square. When assembled into a liquid crystal display device, the length of the optical fiber should be slightly larger than the corresponding liquid crystal display area, the diameter of the optical fiber should be slightly smaller than a corresponding length of the sub-pixel in the corresponding liquid crystal display device.

The first substrate layer 100 can be a reflective layer, the second substrate layer 300 can be composed of one or more optical films with an optical function. A plurality of adhesive blocks in contact with the plurality of optical fibers $200_1$, $200_2$, ... $200_n$ are arranged on a surface of at least one of the first substrate layer 100 and the second substrate layer 300.

For example, the plurality of adhesive blocks can be coated on a surface of at least one of the first substrate layer 100 and the second substrate layer 300. Then the optical fibers $200_1$, $200_2$, ... $200_n$ are adhered to the first substrate layer 100 and/or the second substrate layer 300 through the adhesive blocks. If the plurality of adhesive blocks are to be coated on a surface of the first substrate layer 100, the plurality of adhesive blocks should be coated on a surface of the first substrate layer 100 facing the second substrate layer 300. If the plurality of adhesive blocks are to be coated on a surface of the second substrate layer 300, the plurality of adhesive blocks should be coated on a surface of the second substrate layer 300 facing the first substrate layer 100.

Figure 2:
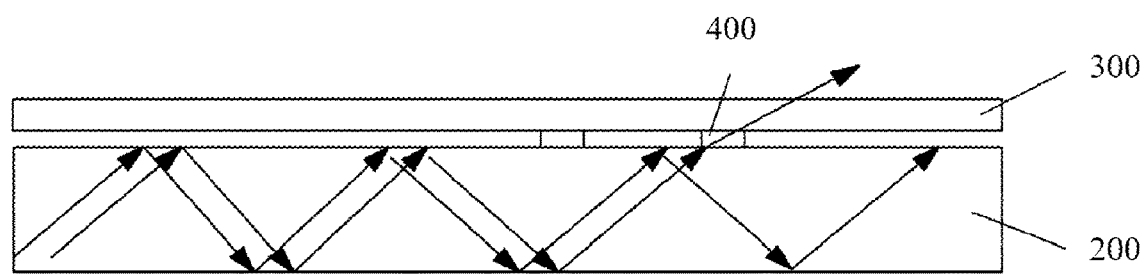
FIG. 2 is a schematic diagram showing light beams transmitted in the optical assembly according to an embodiment of the disclosure.

FIG. 2 is a schematic diagram showing light beams transmitted in the optical assembly according to an embodiment of the disclosure.

In the embodiment shown in FIG. 2, a plurality of adhesive blocks are coated on a surface of the second substrate layer 300. As shown in FIG. 2, a plurality of adhesive blocks 400 are coated on a surface of the second substrate layer 300 facing the first substrate layer 100, such that a part of light beams in the optical fiber layer 200 will not be totally reflected (as indicated by FIG. 2). As an example, only two adhesive blocks 400 are shown in FIG. 2, actually more adhesive blocks 400 can be arranged.

To prevent the light beams from being totally reflected as shown in FIG. 2, the inventor realized that the plurality of adhesive blocks 400 should be arranged such that at the contact regions between the adhesive blocks 400 and the plurality of optical fibers $200_1$, $200_2$, . . . $200_n$, total internal reflection in the optical fiber layer 200 is inhibited by the adhesive blocks 400.

The following arrangements can be applied to ensure that total internal reflection of light beams is inhibited with the contact regions between the adhesive blocks 400 and the optical fibers $200_1$, $200_2$, . . . $200_n$.

In certain exemplary embodiments, a refractive index of the adhesive block at the contact region is higher than a refractive index of the optical fiber $200_1$, $200_2$, . . . $200_n$.

Alternatively, a refractive index of the adhesive block at the contact region is equal to a refractive index of the optical fiber $200_1$, $200_2$, . . . $200_n$, the adhesive block at the contact region is in close contact with the optical fiber.

Alternatively, a refractive index of the adhesive block at the contact region is lower than a refractive index of the optical fiber $200_1$, $200_2$, . . . $200_n$ and higher than a refractive index of air.

Thus, due to a large external refractive index, the light beams undergoing total reflection in the optical fiber can exit from the optical fiber without being totally reflected any more. With the optical functions (such as diffusion and shape correction) of optical layers arranged on the substrate layer, a uniform light output can thus be achieved.

In certain exemplary embodiments, a distribution density of the plurality of adhesive blocks 400 on the surface of at least one of the first substrate layer and the second substrate layer increases with the increase of a distance from an incident end of the optical fiber. At the incident end of the optical fiber, the light intensity in the optical fiber is typically high. The light intensity in the optical fiber is gradually reduced with the increase of the distance from the incident end of the optical fiber. With such an arrangement, the light intensity is more homogeneous, thereby achieving a more uniform display picture.

The adhesive blocks 400 are blocks made of adhesive. The adhesive blocks 400 have viscosity, elasticity and good optical properties. UV curable adhesive can be applied. Moreover, a region for coating the adhesive blocks 400 should be slightly larger than the liquid crystal display area.

As stated above, the optical assembly in the embodiment of the disclosure has the structure shown in FIG. 1 and FIG. 2, total internal reflection in the optical fibers is inhibited by the adhesive blocks 400. A uniform light output can thus be achieved and the transmittance is also improved. Therefore, the embodiment of the disclosure provides an optical assembly which satisfies the requirements of high color gamut display.

In a first implementation of the present disclosure, a liquid crystal display device comprises a liquid crystal display panel (500 in FIG. 1) with a color film layer, the abovementioned optical assembly arranged beneath the liquid crystal display panel, and an RGB tri-color laser light source for providing RGB tri-color laser. The liquid crystal display device further comprises an optical coupler and a light splitter. The optical coupler is used for coupling the RGB tri-color laser provided by the RGB tri-color laser light source into a white light beam. The light splitter is used for dividing the white light beam into a plurality of light beams and guiding each of the plurality of light beams into each of the plurality of optical fibers respectively. The optical fibers are arranged corresponding to sub-pixels in the liquid crystal display panel.

The optical fibers can be arranged corresponding to sub-pixels in the liquid crystal display panel with one of the following two arrangements. In a first arrangement, each of the optical fibers is arranged corresponding to each of the sub-pixels in the liquid crystal display panel. In a second arrangement, each of the optical fibers is arranged corresponding to a plurality of sub-pixels in the liquid crystal display panel, and each sub-pixel corresponds to an adhesive block.

In the first implementation of the present disclosure, the light splitter divides the white light beam into a plurality of light beams with the same energy and guiding each of the plurality of light beams into each of the plurality of optical fibers respectively. Moreover, the optical fibers are arranged such that light transmitted in each optical fiber can only enter a corresponding sub-pixel in the liquid crystal display panel.

In this implementation, a length of the optical fiber is arranged to be larger than a corresponding length of a display area of the liquid crystal display panel. A diameter of the optical fiber is arranged to be smaller than a corresponding length of a sub pixel in the display area, which corresponding length is perpendicular to the longitudinal direction of the optical fiber.

In addition, to guide the white light beam coupled by the optical coupler into the optical fibers beneath the liquid crystal display panel, optical layers such as diffusion sheet and prism sheet can be added into the substrate layer over the optical fibers (i.e., the second substrate layer 300 in FIG. 1). That is, as an optical layer, the second substrate layer can also have optical functions improving viewing angle performance.

The liquid crystal display device comprises the abovementioned optical assembly. Total internal reflection in the optical fibers is inhibited by the arranged adhesive blocks. A uniform light output can thus be achieved, the transmittance is also improved, and the power consumption is reduced. Therefore, the embodiment of the disclosure provides a liquid crystal display device with a high color gamut.

In a second implementation of the present disclosure, a liquid crystal display device comprises a liquid crystal display panel with a color film layer, the abovementioned optical assembly arranged beneath the liquid crystal display panel, and an RGB tri-color laser light source for providing RGB tri-color laser to the optical fibers in the optical assembly.

In this implementation, the optical fibers are arranged such that light transmitted in each optical fiber can only enter a corresponding sub-pixel in the liquid crystal display panel. That is, each of the optical fibers is arranged corresponding to each sub-pixel in the liquid crystal display panel.

In particular, in this implementation, each laser beam emitted from the RGB tri-color laser light source is equally divided into several parts. This parts are respectively provided to the optical fibers beneath the liquid crystal display panel. The same energy is provided to each optical fiber, it is thus ensured that the output intensities are same with each other. Therefore the uniformity for the brightness on the screen is ensured.

Figure 3:
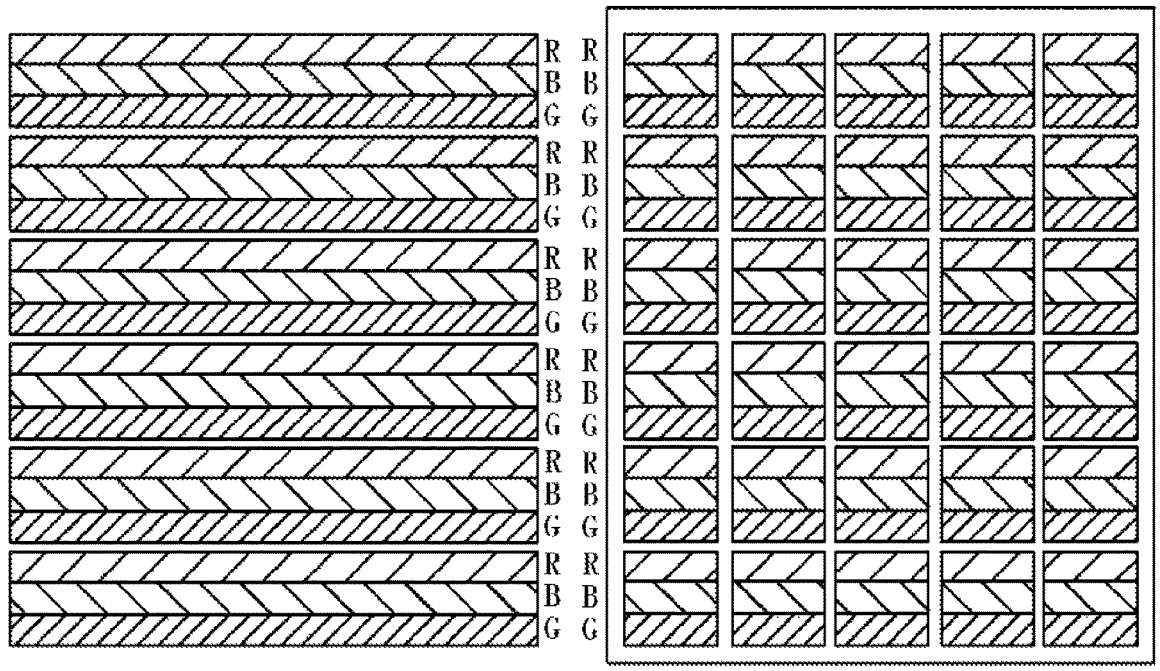
FIG. 3 is a schematic diagram showing a correspondence between the optical fibers and the array of RGB filters in the color film layer according to a second implementation of the disclosure.

In addition, the optical fibers transmitting light with different colors are arranged in various circular sequences (such as RGB). The various circular sequences comprise but are not limited to RGB, RBG, GRB, GBR, BRG and BGR. The circular sequence is same to an arrangement sequence for the filters in the colfor film layer. Thus, the light beams emitted from the optical fibers are one-to-one corresponding to the filters in the color film layer. FIG. 3 is a schematic diagram showing a correspondence between the optical fibers and the array of RGB filters in the color film layer according to a second implementation of the disclosure. As shown in FIG. 3, for example, the optical fibers on the left are arranged in a circular sequence RGB. The circular sequence RGB of the optical fibers on the left corresponds to the RGB sequence of the color film layer on the right. With such an arrangement, light emitted from the optical fibers can one-to-one correspond to the filters in the color film layer. In such a manner, the transmittance for the light beam corresponding to the filter of the color film layer is relatively high. Scattered light from adjacent optical fiber can be absorbed. The overall transmittance can thus be improved, thereby reducing energy consumption.

In certain exemplary embodiments, in this implementation, a length of the optical fiber is larger than a corresponding length of a display area of the liquid crystal display panel, a diameter of the optical fiber is smaller than a corresponding length of a sub pixel in the display area.

In a third implementation of the present disclosure, a liquid crystal display device comprises a liquid crystal display panel without color film layer, the abovementioned optical assembly arranged beneath the liquid crystal display panel, and an RGB tri-color laser light source for providing RGB tri-color laser to the optical fibers in the optical assembly.

In this implementation, the optical fibers are arranged such that light transmitted in each optical fiber can only enter a corresponding sub-pixel in the liquid crystal display panel. That is, the optical fibers are arranged corresponding to sub-pixels in the liquid crystal display panel. Further, in this implementation, each laser beam emitted from the RGB tri-color laser light source is equally divided into several parts. These parts are respectively provided to the optical fibers beneath the liquid crystal display panel. The same energy is provided to each optical fiber, it is thus ensured that the output intensities are same with each other. Therefore the uniformity for the brightness on the screen is ensured. Similar to the second implementation, in the third implementation, the optical fibers transmitting light with different colors are arranged in various circular sequences (such as RGB). The circular sequence is same to an arrangement sequence for the filters in the color film layer. Thus, the light beams emitted from the optical fibers are one-to-one corresponding to the filters in the color film layer.

The difference between the second implementation and the third implementation lies in the alignment accuracy error for the optical fibers and the sub-pixels in the liquid crystal display panel is optimized and reduced to less than 1 micrometer. If the diameter of the optical fiber is arranged as about 50 micrometer and the alignment accuracy error is reduced to less than 1 micrometer, compared with the diameter, the optical fibers can be deemed as being accurately aligned with the sub-pixels in the liquid crystal display panel. Thus, crosstalk between the optical fibers can be reduced, each light beam emitted from an optical fiber corresponding to the location of a sub-pixel is monochromatic light. Therefore, light splitting effect of a color film layer can be achieved, a color film layer is no more required. In this implementation, light splitting effect can be achieved without color film layer, the transmittance is also improved with the optical assembly, thereby providing a liquid crystal display device with a high color gamut.

To sum up, the embodiment of the present disclosure provides an optical assembly. The optical assembly comprises a first substrate layer, a second substrate layer, and an optical fiber layer arranged between the first substrate layer and the second substrate layer. The optical fiber layer is composed of a plurality of optical fibers arranged closely in a single layer. A plurality of adhesive blocks in contact with the plurality of optical fibers are arranged on a surface of at least one of the first substrate layer and the second substrate layer. At the contact regions between the adhesive blocks and the plurality of optical fibers, total internal reflection in the optical fibers is inhibited by the adhesive blocks. Since total internal reflection at the contact regions is inhibited by a large external refractive index, the light beams undergoing total reflection in the optical fiber can exit from the optical fiber without being totally reflected any more. The transmittance is thus improved, an optical assembly with a high color gamut can be realized. Therefore, the transmittance of the liquid crystal display device consisting of such an optical assembly is also improved with reduced power consumption, achieving high color gamut display. Further, by adjusting the alignment accuracy error for the optical fibers and the sub-pixels in the liquid crystal display panel, a liquid crystal display device without color film layer can be realized.

The optical assembly and the liquid crystal display device with the optical assembly according to the embodiments of the invention are illustrated with the abovementioned implementations. The above embodiments are only used for explanations rather than limitations to the present invention, the ordinary skilled person in the related technical field, in the case of not departing from the spirit and scope of the present invention, may also make various modifications and variations, therefore, all the equivalent solutions also belong to the scope of the present invention, the patent protection scope of the present invention should be defined by the claims.

What is claimed is:

1. An optical assembly comprising:
   a first substrate layer;
   a second substrate layer;
   an optical fiber layer arranged between the first substrate layer and the second substrate layer; and
   a plurality of adhesive blocks;
   wherein the optical fiber layer is composed of a plurality of optical fibers arranged in a single layer; each optical fiber comprises an incident end so that light is transmitted along a longitudinal direction of the optical fiber in form of total internal reflection;
   wherein the plurality of adhesive blocks are arranged on a surface of the first substrate layer facing the plurality of optical fibers and in contact with the plurality of optical fibers; for each optical fiber, at least two adhesive blocks are located in the longitudinal direction of the optical fiber with a gap and in contact with a top portion of the optical fiber;
   wherein at contact regions between the adhesive blocks and the plurality of optical fibers, total internal reflection in the optical fibers is inhibited by the adhesive blocks so that light is extracted from the plurality of optical fibers;
   and wherein a refractive index of the plurality of adhesive blocks is higher than a refractive index of the plurality of optical fibers.

2. The optical assembly according to claim 1, wherein a distribution density of the plurality of adhesive blocks on the surface of at least one of the first substrate layer and the second substrate layer increases with the increase of a distance from the incident end of the optical fiber.

3. The optical assembly according to claim 1, wherein a material of the adhesive block is UV curable adhesive.

4. The optical assembly according to claim 1, wherein the first substrate layer is a reflective layer, the second substrate layer is an optical film layer;
alternatively, the first substrate layer is an optical film layer, the second substrate layer is a reflective layer.

5. A liquid crystal display device comprising:
a liquid crystal display panel with a color film layer;
the optical assembly according to claim 1 arranged beneath the liquid crystal display panel;
an RGB tri-color laser light source for providing RGB tri-color laser;
an optical coupler for coupling the RGB tri-color laser provided by the RGB tri-color laser light source into a white light beam; and
a light splitter for dividing the white light beam into a plurality of light beams and guiding each of the plurality of light beams into each of the plurality of optical fibers respectively;
wherein the optical fibers are arranged corresponding to sub-pixels in the liquid crystal display panel.

6. The liquid crystal display device according to claim 5, wherein each of the optical fibers is arranged corresponding to each of the sub-pixels in the liquid crystal display panel.

7. The liquid crystal display device according to claim 5, wherein each of the optical fibers is arranged corresponding to a plurality of sub-pixels in the liquid crystal display panel, each sub-pixel corresponds to an adhesive block.

8. The liquid crystal display device according to claim 6, wherein the light splitter divides the white light beam into a plurality of light beams uniformly and guiding each of the plurality of light beams into each of the plurality of optical fibers respectively.

9. The liquid crystal display device according to claim 8, wherein the optical fibers are arranged such that light transmitted in each optical fiber can only enter a corresponding sub-pixel in the liquid crystal display panel.

10. The liquid crystal display device according to claim 9, wherein a length of the optical fiber is larger than a corresponding length of a display area of the liquid crystal display panel, a diameter of the optical fiber is smaller than a corresponding length of a sub pixel in the display area.

11. The liquid crystal display device according to claim 9, wherein the liquid crystal display panel comprises a color film layer; and
wherein each laser beam emitted from the RGB tri-color laser light source is equally divided into several parts, which several parts are respectively provided to the optical fibers in a predetermined circular sequence; the optical fibers are arranged in the predetermined circular sequence which is same to an arrangement sequence for RGB filters in the color film layer.

12. The liquid crystal display device according to claim 9, wherein each laser beam emitted from the RGB tri-color laser light source is equally divided into several parts, which several parts are respectively provided to the optical fibers in a predetermined circular sequence; the optical fibers are arranged in the predetermined circular sequence which is same to an arrangement sequence for RGB filters in the color film layer; and
wherein an alignment accuracy error for the optical fibers one-to-one corresponding to the sub-pixels in the liquid crystal display panel is less than 1 micrometer.

13. A liquid crystal display device comprising:
a liquid crystal display panel;
the optical assembly according to claim 1 arranged beneath the liquid crystal display panel; and
an RGB tri-color laser light source for providing RGB tri-color laser to the optical fibers in the optical assembly;
wherein each of the optical fibers is arranged corresponding to each sub-pixel in the liquid crystal display panel.

14. The liquid crystal display device according to claim 13, wherein the optical fibers are arranged such that light transmitted in each optical fiber can only enter a corresponding sub-pixel in the liquid crystal display panel.

15. The liquid crystal display device according to claim 14, wherein a length of the optical fiber is larger than a corresponding length of a display area of the liquid crystal display panel, a diameter of the optical fiber is smaller than a corresponding length of a sub pixel in the display area.

16. The liquid crystal display device according to claim 10, wherein the liquid crystal display panel comprises a color film layer; and
wherein each laser beam emitted from the RGB tri-color laser light source is equally divided into several parts, which several parts are respectively provided to the optical fibers in a predetermined circular sequence; the optical fibers are arranged in the predetermined circular sequence which is same to an arrangement sequence for RGB filters in the color film layer.

17. The liquid crystal display device according to claim 10, wherein each laser beam emitted from the RGB tri-color laser light source is equally divided into several parts, which several parts are respectively provided to the optical fibers in a predetermined circular sequence; the optical fibers are arranged in the predetermined circular sequence which is same to an arrangement sequence for RGB filters in the color film layer; and
wherein an alignment accuracy error for the optical fibers one-to-one corresponding to the sub-pixels in the liquid crystal display panel is less than 1 micrometer.

18. The liquid crystal display device according to claim 13, wherein each laser beam emitted from the RGB tri-color laser light source is equally divided into several parts, which several parts are respectively provided to the optical fibers in a predetermined circular sequence; the optical fibers are arranged in the predetermined circular sequence which is same to an arrangement sequence for RGB filters in the color film layer; and
wherein an alignment accuracy error for the optical fibers one-to-one corresponding to the sub-pixels in the liquid crystal display panel is less than 1 micrometer.

* * * * *